United States Patent Office
3,817,801
Patented June 18, 1974

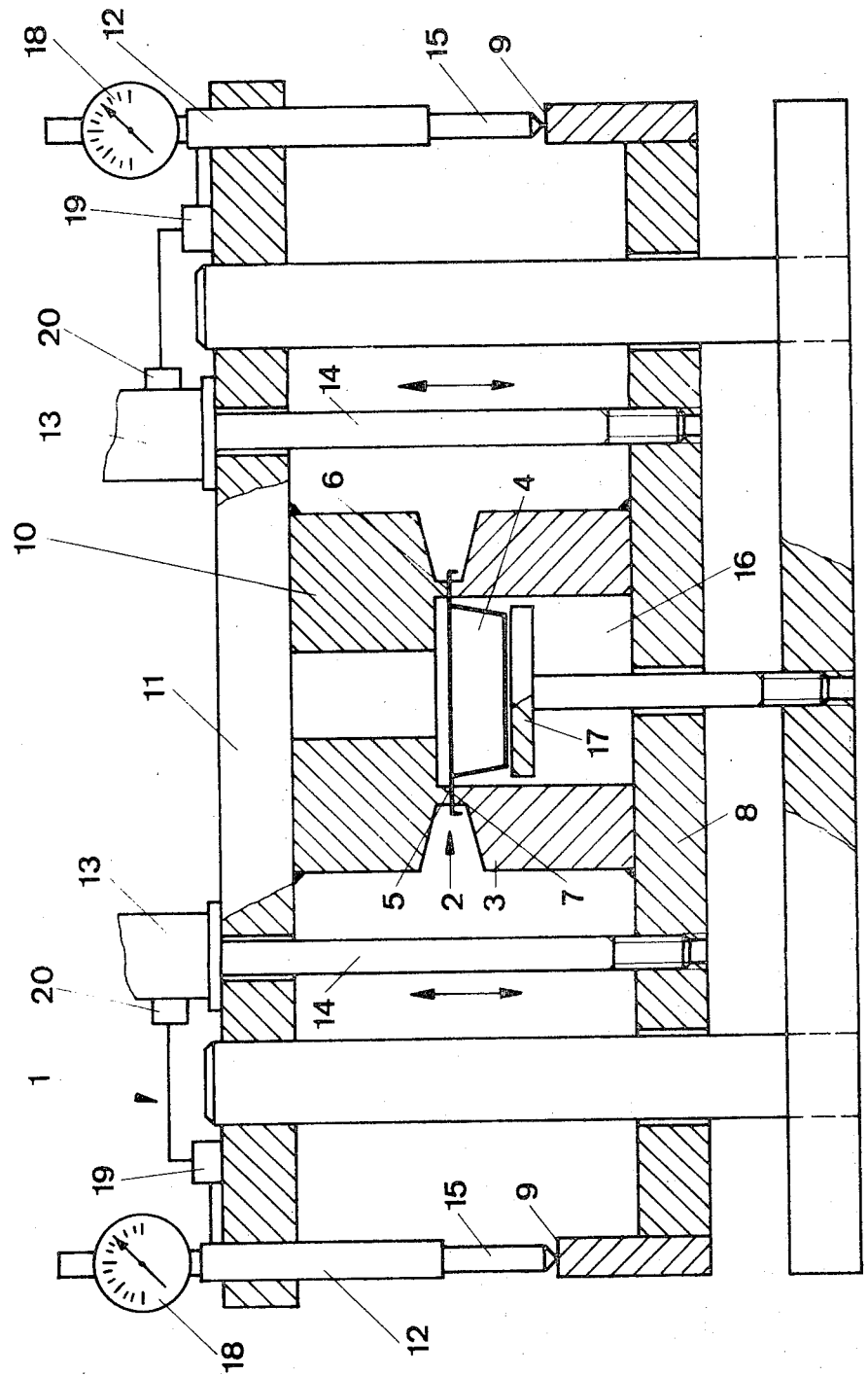

3,817,801
METHOD AND DEVICE FOR SEALING OF CONTAINERS OR PACKAGES COVERED WITH HEAT-SEALABLE FOIL
Karl Widmer, Zurich, Switzerland, assignor to Swiss Aluminium Ltd., Chipps, Switzerland
Filed June 13, 1972, Ser. No. 262,246
Claims priority, application Switzerland, June 15, 1971, 8,695/71
Int. Cl. B29c 27/02
U.S. Cl. 156—69                1 Claim

ABSTRACT OF THE DISCLOSURE

Method and device for sealing of containers or packages covered with heat sealable foil by welding of plastics layers under simultaneous employment of pressure and heat, whereby for sufficiently tight sealing during the pressing and welding operation a measurement of the thickness of the two layers welded together, and an interpretation of the measurement results for control of the welding operation, takes place. The device for carrying out the method consists in a welding and pressure device for sealing of containers is in operative connection with a measuring, controlling, and adjusting device.

---

The present invention relates to a method and a device for sealing of containers or packages by welding of plastics layers.

Containers of thermoplastic plastics foil or of metal foil coated with thermoplastic plastics, especially aluminum foil or aluminum strip, are closed by heat sealing. In doing this, parts of the container and lid are joined together with the employment of pressure and heat by welding the superimposed plastics layers together. For example there are known boxes with a container part, the upper edge of which is bent outwards, and onto which the lid foil is sealed. If such containers closed by heat sealing are filled with perishable goods and/or subjected to a sterilisation process by heating, there arises the problem of tightness of the sealed joint, which hitherto has been subjected to a checking in a following operational stage.

For example methods and devices are known by which the container in a first stage is first sealed by welding of superimposed plastics layers, and in a second stage is subjected to a checking in respect of the tightness of the sealed joint.

It has appeared particularly disadvantageous that the sealing and checking of the sealed joint of the container hitherto has been carried out in two stages. The disadvantages appeared particularly by the introduction of several operators for serving the two devices as well as by the relatively large consumption of time for the sealing and for the following checking of the sealing.

The object underlying the present invention is to provide a method and a device for carrying out the method with which the disadvantages attached to the methods and devices described above are avoided. With the invention moreover a satisfactory sealing of the container will be achieved in an improved manner, so that the allowance of containers inadequately sealed and filled with perishable goods is reduced to a minimum amount.

According to the method of the invention the object underlying it is solved in that for sufficiently tight sealing during the pressing and welding operation a measurement of the thickness of the two layers welded together, and an interpretation of the measurement results for control of the welding operation, takes place.

The device for carrying out the method is characterised in that a welding and pressing device for sealing of containers is in operative connection with a measuring, controlling, and adjusting device.

The drawing shows a constructional example of the subject of the invention in simplified showing, that is to say:

According to the constructional example shown in the drawing, the device 1 has a lower part 3 belonging to the welding and pressing device 2 for reception of a foil container 4 which is to be welded and checked, with a peripheral flange 5 which is to be sealed with the periphery of a lid 6 in a known manner by welding of two plastics layers with simultaneous employment of pressure and heat. The lower part 3 has on its upper end a receiving surface 7 for the peripheral flange 5 of the container 4, which surface preferably extends around the container 4. Furthermore a rigid plate 8 is fixedly connected with the lower part 3 of the welding and pressing device 2, which plate at its two ends preferably has two abutment surfaces 9. The stationary upper part 10 of the welding and pressing device 2 is fixedly connected with an upper plate 11, at the ends of which there are arranged measuring devices 12 for measuring the amount of melting of the plastics layers. By movable elements 13, for example in the form of a pneumatically operated working cylinder with a piston rod 14, the lower plate 8 with the lower part 3 and the container 4 within it as well as the abutment surfaces 9 at the ends of the lower plate 8, for the purpose of sealing and simultaneous adjustment and checking of the latter, is pressed in the direction towards the upper part 10, or as the case may be against a feeler 15 of the measuring device 12. By this means the amount of melting of the plastics which occurs during sealing is detected via the lower part 3, the abutment surfaces 9 of the lower plate 8, and the feelers 15 of the measuring device 12, or as the case may be a non-uniform melting of the plastics is indicated by different signal outputs of the measuring device 12.

After termination of the sealing operation the container 4 is pushed out by a non-moving fixedly arranged supporting disc 17 in a cavity 16 of the lower part 3 with the help of a thrusting device not described in more detail, and thereupon a new container to be sealed is shifted onto the disc 17, whereupon a successive operation for sealing of a container 4 is repeated, occurring in the manner described above. The sealing period is maintained for so long that a predetermined necessary reduction of thickness or the required degree of melting respectively is achieved. If on the contrary the desired amount of melting is not achieved after a set maximum sealing period, or only a non-uniform degree of melting, then the machine is stopped and/or the container is thrown away as defective in a well known manner. The amount of melting of the superimposed plastics layers occurring during the sealing operation is measured at at least two places.

The known measuring devices 12 which come to be employed have, for signal supply to the welding and pressing device 2, or for adjusting the sealing period, the use of an electronically controlled feeler 15, which at the lower end abuts on one of the abutment surfaces 9 of the plate 8. The feeler 15 is provided with a dial gauge 18, on which the instantaneous measurements can be read. In operative connection with the feeler 15 through an amplifier 19 there is an adjusting device 20, which is arranged on the moving element 13 or on the pneumatic working cylinder of the welding and pressing device 2, and actuates the working cylinder 14 corresponding to the pulses coming from the feeler 15. The measuring device 12 is made to be adjustable and variable, so that by means of it a predetermined thickness of the layers to be sealed, or the desired intended value can be adjusted.

By the invention it has now become possible to provide a method and a device for sealing of containers, by which in one operation the sealing of containers and also a simultaneous checking of the sealing are undertaken. From this there results in advantageous manner a very significant saving in working time and working personnel.

What I claim is:

1. Method for sealing a container or a package covered with a heat sealable foil having at least one thermoplastic layer, with a closure having at least one thermoplastic layer, comprising the steps of:

welding of superimposed thermoplastic layers of said closure and said container together under simultaneous employment of pressure and heat;

measuring at least at two opposite locations the thickness of the thermoplastic layers being welded together whereby the amount of melting of the thermoplastic layers arising in the welding step is measured; and obtaining data from said measuring step for continuously controlling the welding step.

References Cited

UNITED STATES PATENTS 3,606,727   9/1971   Davis _____ 156—360 X

FOREIGN PATENTS 1,193,838   7/1967   Great Britain.

EDWARD G. WHITBY, Primary Examiner

U.S. Cl. X.R.

156—69, 360, 378, 583